United States Patent
Boltz et al.

(10) Patent No.: US 6,233,445 B1
(45) Date of Patent: May 15, 2001

(54) ESTABLISHING EMERGENCY CALLS WITHIN A MOBILE TELECOMMUNICATIONS NETWORK

(75) Inventors: David Boltz, Garland; Vladimir Alperovich, Dallas, both of TX (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 08/782,406

(22) Filed: Jan. 14, 1997

(51) Int. Cl.[7] .................................................. H04M 11/00
(52) U.S. Cl. .......................... 455/404; 455/521; 379/45
(58) Field of Search ............................ 455/404, 528, 455/412, 521, 456, 457; 379/45, 201, 207, 220, 51

(56) References Cited

U.S. PATENT DOCUMENTS

| | | | |
|---|---|---|---|
| 5,052,048 | * 9/1991 | Heinrich | 455/66 |
| 5,479,482 | * 12/1995 | Grimes | 379/59 |
| 5,548,583 | 8/1996 | Bustamante . | |
| 5,598,460 | * 1/1997 | Tendler | 379/59 |
| 5,689,548 | * 11/1997 | Maupin et al. | 379/59 |
| 5,712,900 | * 1/1998 | Maupin et al. | 379/59 |

OTHER PUBLICATIONS

PCT International Search Report, Sep. 23, 1998, PCT/US 98/00753.

* cited by examiner

*Primary Examiner*—Lee Nguyen
*Assistant Examiner*—Congvan Tran
(74) *Attorney, Agent, or Firm*—Jenkens & Gilchrist

(57) ABSTRACT

A location of a first emergency call connection requested from a mobile station within a mobile telecommunications network is determined. Thereafter, if a second emergency call connection is requested from another mobile station within approximately the same geographic area or location, an announcement message informing the caller of the already reported incident is provided. The caller then has the option of terminating the call or connecting to a Public Safety Answering Point (PSAP) operator. An application module associated with the serving mobile telecommunications network may further transmit unstructured data, such as Short Message Service (SMS) or Unstructured Supplementary Service Data (USSD) messages, to all other mobile stations currently traveling within the reported location or area. Such reporting enables other mobile subscribers to be informed of the reported incident and not to request emergency call connections in an attempt to report the same incident. It may further enable other mobile stations to avoid or detour around the reported site.

9 Claims, 5 Drawing Sheets

ESTABLISHING EMERGENCY CALLS WITHIN A MOBILE TELECOMMUNICATIONS NETWORK

BACKGROUND OF THE INVENTION

1. Technical Field of the Invention

The present invention relates to a mobile telecommunications network and, in particular, to informing mobile stations as to prior requested emergency call connections from substantially the same geographic area.

2. Description of Related Art

The Emergency Service Bureau (ESB), more commonly known in the United States as 9-1-1 service, provides emergency assistance to persons in need of help. A mobile telephone subscriber, for example, seeking emergency service merely has to dial a short unique number (such as 911 in the U.S.) to establish a fast emergency call connection with a Public Safety Answering Point (PSAP) providing the ESB service. With the improvements and developments in mobile telecommunications technology, the PSAP is able to ascertain the approximate location of the mobile station (via cell identity, or global positioning system -GPS, etc.), and provide emergency assistance to the requesting mobile station based on mobile station location.

In case an emergency incident occurs within a densely populated or frequently traveled location, such as a major highway or crowded public place, it is known that a large number of emergency calls reporting the same incident are often generated towards an associated PSAP. This is because individuals reporting the incident are unable to previously determine whether the incident has already been reported to the PSAP. While the ESB does not want to discourage individuals from reporting emergencies, such an increase in the number of emergency 911 calls can inundate the PSAP terminals with known adverse effects. For example, such multiple reports of the same incident tie up the PSAP operators and associated communications links and, may prevent operators from handling new, and perhaps higher priority, emergency calls. Inability to answer and assist a new emergency situation is obviously undesirable within the ESB system.

Accordingly, there is a need for a mechanism to help limit or reduce the number of emergency calls placed and answered relating to the same emergency or incident.

SUMMARY OF THE INVENTION

A request for an emergency call connection is received by a mobile switching center (MSC) serving a particular mobile station. A determination is then made of the current location of the mobile station requesting the emergency call connection. A further determination is made as to whether another emergency call connection has already been received from approximately the same location area from another mobile station. In response to an affirmative determination, the mobile station is informed through an announcement message that an emergency has already been reported within the area of the current mobile station location. The mobile station may then terminate the emergency call connection or remain on-line to be connected to a Public Safety Answering Point (PSAP).

In another embodiment of the present invention, a request for an emergency call connection is received by a serving MSC from a mobile station traveling within a particular geographic area. Thereafter, all other mobile stations traveling within approximately the same geographic area receive a message indicating that an emergency has been reported. Such a message may be transmitted by use of an unstructured data transmission to the mobile stations over one of the control channels. Mobile subscribers associated with the mobile stations receiving the message are then put on notice that an emergency has already been reported.

In yet another embodiment of the present invention, such announcement messages or unstructured data transmission are communicated only after a threshold number of emergency call connections or attempts have been received from approximately the same geographic area.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
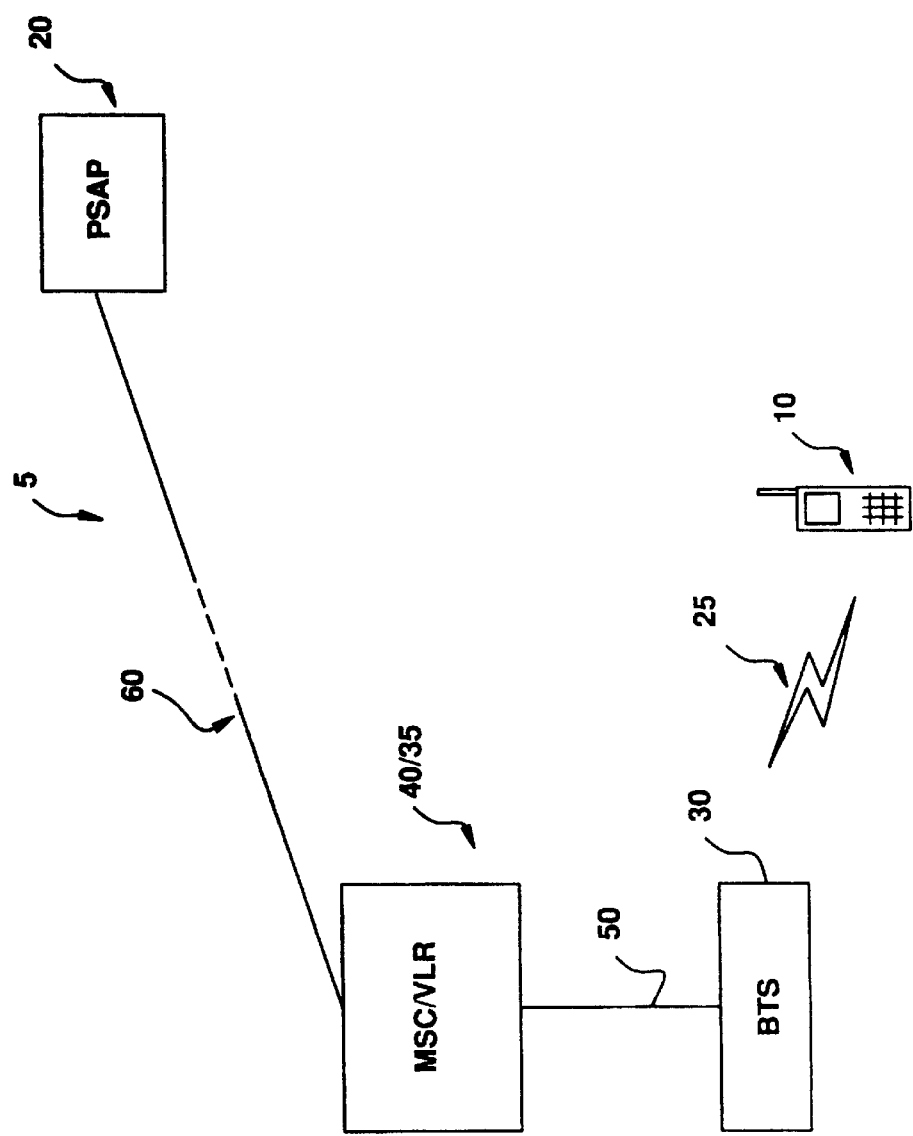
FIG. 1 is a block diagram of a telecommunications network illustrating a call connection between a mobile station and a Public Safety Answering Point (PSAP)

FIG. 1 is a block diagram of a telecommunications network 5 illustrating a call connection between a mobile station 10 and a Public Safety Answering Point (PSAP) 20. The mobile station 10 originates an emergency call connection towards the PSAP 20 by merely dialing a predetermined short number, such as 9-1-1 in the United States. An over-the-air signal 25 is then received by a base transceiver station (BTS) 30 providing radio coverage for that particular geographic area associated with the requesting mobile station 10. The received signal is then forwarded to an associated mobile switching center (MSC) 40 and visitor location register (VLR) 35 via an interface link 50 connected therebetween. The MSC 40 and VLR 35 are often co-located with each other, and are hereinafter collectively referred to as an MSC/VLR. The serving MSC/VLR 40/35 then recognizes that the mobile station is requesting an emergency call connection, and establishes a call connection 60 towards the associated PSAP 20. Once the connection 60 is established, the mobile station 10 may request emergency assistance from or report an emergency situation towards the PSAP 20.

For purposes of simplifying the illustration, no signal transfer points (STPs), tandem switches, and in case more than one PSAP is available, selective router (SR) elements of the network 5 are shown in FIG. 1. However, it is to be understood that the call connection 60 may be established via a number of STPs, intermediate switches, or SR.

If an accident or emergency situation occurs within a densely populated or frequently traveled place, the PSAP 20 often receives multiple emergency call connections reporting the same incident from a number of different mobile subscribers. Such call connections reporting the same incident tie up valuable trunk connections and/or PSAP terminals, and prevent or delay reporting of a new, and perhaps higher priority, emergency to the PSAP.

Figure 2:
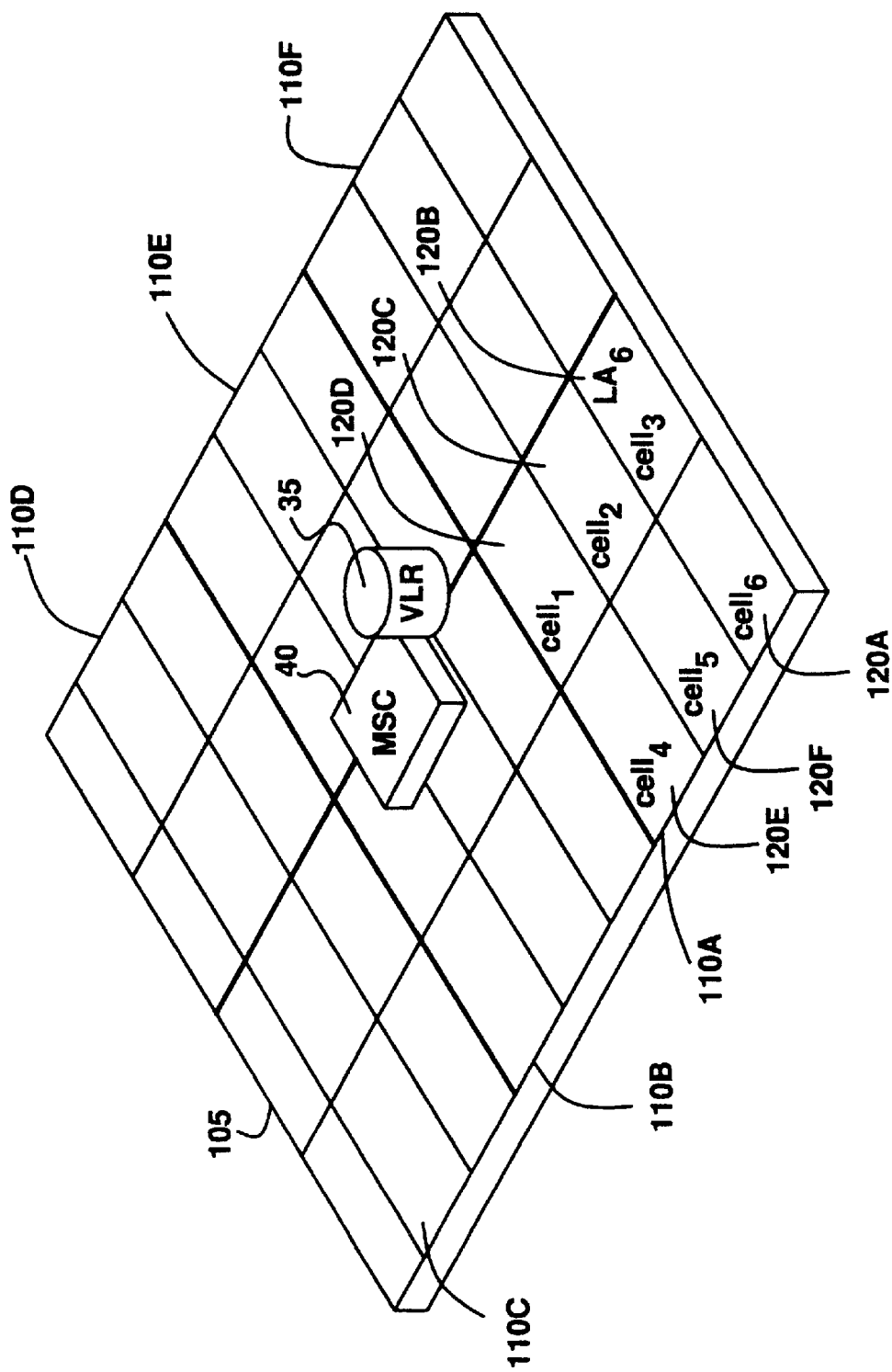
FIG. 2 is a block diagram of a mobile telecommunications network illustrating a plurality of coverage areas within a serving mobile switching center (MSC) area.

Reference is now made to FIG. 2 illustrating a plurality of coverage areas 110A–110F within a serving mobile switching center (MSC) area 105. The serving MSC/VLR 40/35 provides mobile telecommunications service over a particular geographic area. The MSC coverage area 105 is partitioned into a number of location areas 110A–110F. Each time a mobile station enters a new location area 110, the mobile station performs a location update to inform the MSC/VLR 40/35 and the associated home location register (HLR, not shown in FIG. 2) of its new location. Each location area 110 is further partitioned into a number of cell areas 120A–120F. Each cell area is served by a particular base transceiver station (BTS) for effectuating radio communication with mobile stations currently traveling within the respective cell area. Whenever a mobile station originates an emergency call connection, an associated BTS (not shown in FIG. 2) serving the appropriate cell area covering the mobile station detects the transmitted signal and forwards the received signal to the serving MSC/VLR 40/35. At the same time, using the identity assigned to the relevant BTS, such as a cell identity (CI), the mobile system is able to ascertain the approximate geographic location or area of the mobile station.

Alternatively, with the improvements and further developments of satellite technology, a mobile station is coupled to a Global Positioning System (GPS) device. Whenever a mobile station originates an emergency call connection, the mobile station may further determine its current GPS coordinates and transmit the determined GPS coordinates to the serving MSC/VLR 40/35. A number of other terminal locating schemes and systems are widely well known within the mobile telecommunications system.

Figure 3:
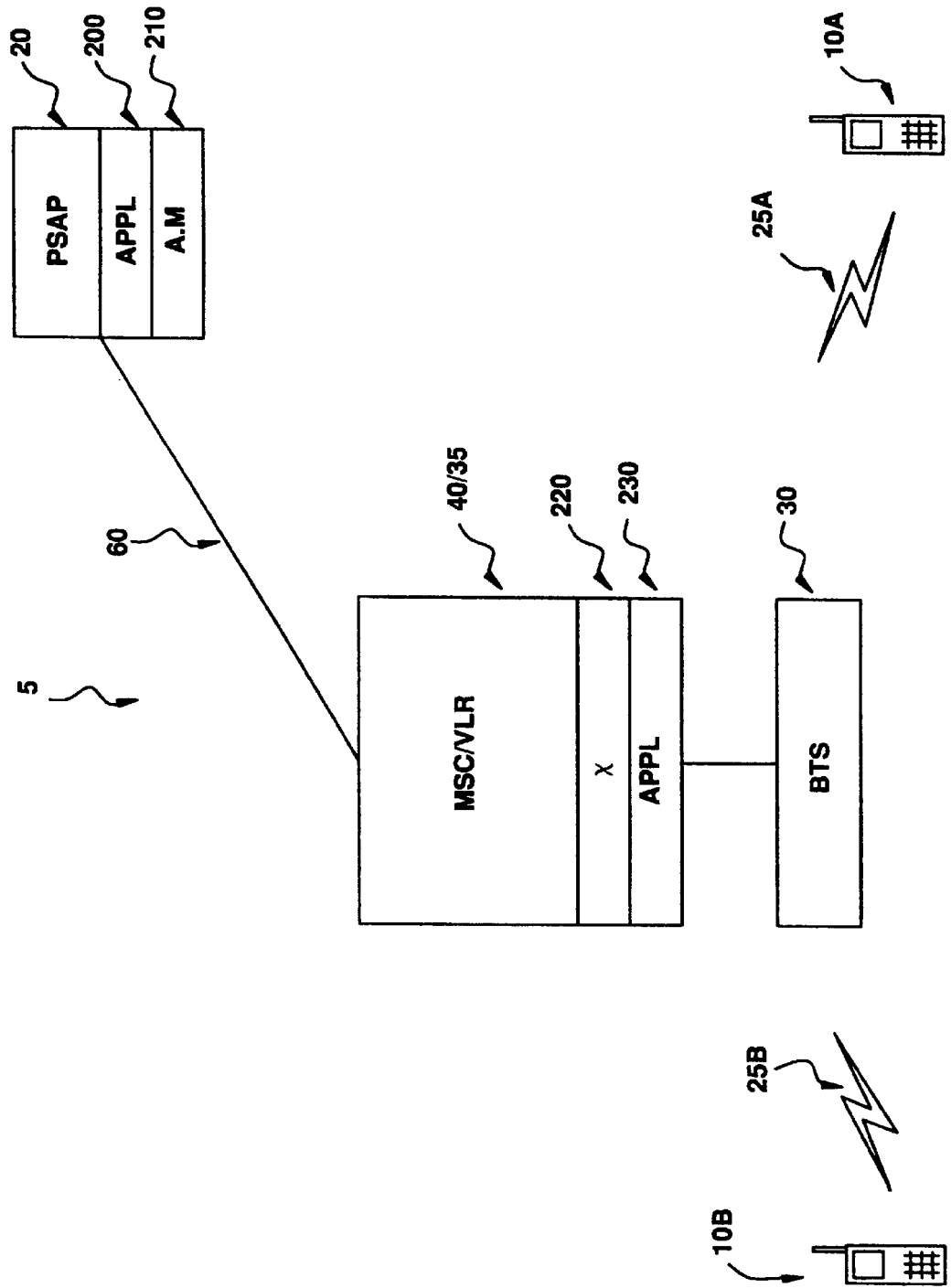
FIG. 3 is a block diagram of a mobile telecommunications network illustrating a call connection between mobile stations and the PSAP in accordance with the teachings of the present invention.

FIG. 3 is a block diagram of a mobile telecommunications network 5 illustrating a call connection 60 between mobile stations 10 and the PSAP 20 in accordance with the teachings of the present invention. A first mobile station 10A originates an emergency call connection towards the PSAP 20 by dialing the predetermined access number (such as 911 in the U.S.). The transmitted radio signal 25A is first received by the BTS 30 serving the appropriate cell area and forwarded to the serving MSC/VLR 40/35. The serving MSC/VLR 40/35 then instructs an associated switch 220 to establish a call connection 60 between the serving MSC/VLR and the appropriate PSAP 20. A first application module 230 associated with the serving MSC/VLR 40/35 then ascertains the current location of the first mobile station 10A (as described with respect to FIGS. 1 & 2) and further transmits the determined location data to the PSAP 20. Such location data may include cell area identities, GPS coordinates, and other well known mobile station location information.

The determined location data can be transmitted to the PSAP 20 via a number of different alternatives. If a trunk connection between the MSC/VLR 40/35 and the PSAP 20 comprises a Centralized Automated Message Accounting (CAMA) trunk, location data are transmitted over the CAMA trunk as pseudo Automatic Number Identification (pANI) data. Accordingly, seven or eight digits representing the current location of the mobile station are transmitted from the serving MSC/VLR to the PSAP or ESB as the pANI data within a Call Setup signal.

Alternatively, if the emergency service call is made over an Integrated Services Digital Network User Part (ISUP) trunk within a Signaling System No. 7 (SS7) telecommunications network, optional or unused parameters within the ISUP call setup signal (Initial Address Message (IAM)) can be utilized to transport the location data towards the PSAP terminal 20. Furthermore, over the ISUP trunk, the location data can also be transmitted using an application layer signal, such as a Transaction Capability Application Part (TCAP) signal, towards the PSAP 20.

In response to the receipt of the location data from the serving MSC/VLR 40/35, a second application module (APPL) 200 associated with the PSAP 20 stores the location data. The second application module (APPL) 200 may further store other information representative of the emergency or incident reported by the first mobile station. Such information may be provided by a PSAP operator after having ascertained the nature of the accident or emergency from a conversation with the reporting subscriber via the first mobile station.

Thereafter, a second mobile station 10B located within the same location area as the first mobile station or approximately thereto originates another emergency call connection towards the PSAP 20. The transmitted radio signal 25B is received by the serving BTS 30 and forwarded to the serving MSC/VLR 40/35. The switch 220 is then instructed to effectuate a call connection with the PSAP 20 over the relevant trunk connection. The first application module 230 again ascertains the current location of the second mobile station 10B and transmits the location data to the PSAP 20.

The second application module 200 associated with the PSAP 20 then receives the location data representing the second mobile station 10B and determines whether an emergency or accident has already been reported from approximately the same location area. By evaluating the information previously stored for the first mobile station 10A, the application module 200 is able to determine that a reporting has already been received from approximately the same geographic area. The second application module 200 then instructs an associated announcement machine (AM) 210 to provide an announcement message towards the second mobile station 10B. Such a message informs the mobile subscriber that an incident from approximately the same geographic area has already been reported. If available, the announcement message may further include the nature of the reported incident. The mobile subscriber associated with the second mobile station 10B may then choose to remain connected to the PSAP after hearing the played message, hang-up and terminate the call, or interrupt the announcement message and immediately be connected to the next available PSAP operator.

Figure 4:
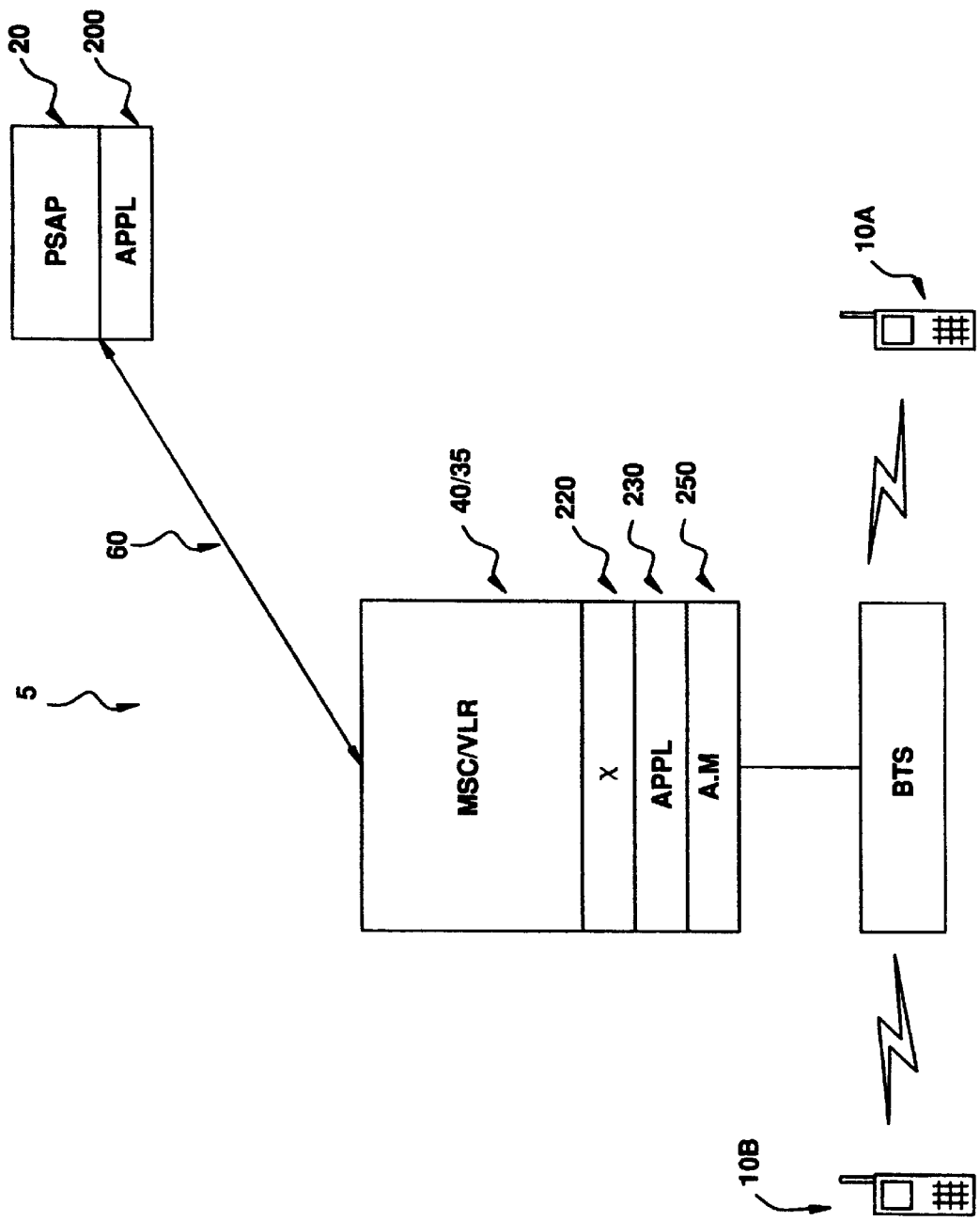
FIG. 4 is a block diagram of a mobile telecommunications network illustrating a serving MSC providing an announcement message to a mobile station in accordance with the teachings of the present invention.

As an alternative embodiment of the present invention, reference is now made to FIG. 4 illustrating the serving MSC/VLR 40/35 providing the announcement message to the second mobile station 10B. An emergency call connection 60 is established for the first mobile station 10A currently traveling within a particular geographic location or area. The first application module 230 associated with the serving MSC/VLR 40/35 determines the current location of the first mobile station 10A and stores the determined location data. The second application module 200 associated with the PSAP 20 may further ascertain the nature of the emergency call connection and provide such information back to the serving MSC/VLR 40/35. Such information may be a predetermined value associated with a pre-recorded message or it may further be a voice recording of a PSAP operator describing the incident. Thereafter, the second mobile station traveling within the serving MSC coverage area requests another emergency call connection towards the PSAP 20. Instead of effectuating a second call connection over the associated trunks to the PSAP 20, the first application module 230 associated with the serving MSC/VLR 40/35 initially determines whether the second emergency call connection request is coming from approximately the same geographic area as the first mobile station 10A. In response to an affirmative determination, the application module 230 instructs its associated announcement machine (A.M.) 250 to play an appropriate message informing the second mobile station of the previously reported incident. As described previously, the second mobile station may listen to the recorded message and terminate the call knowing that the accident or emergency has already been reported, remain on-line and be connected to the next available operator, or even interrupt the announcement message and immediately be connected to the next available PSAP operator. In case the mobile subscriber associated with the second mobile station 10B chooses to exercise the latter two options, the application module 230 instructs the switch 220 to effectuate a new call connection towards the PSAP 20. By screening emergency call connections as described above, valuable trunk connections are not seized for redundant emergency call connections.

Such a message may be generated for a predetermined amount of time (such as 20 minutes after the first reporting of the incident by the first mobile station 10A), or until the PSAP instructs otherwise.

Figure 5:
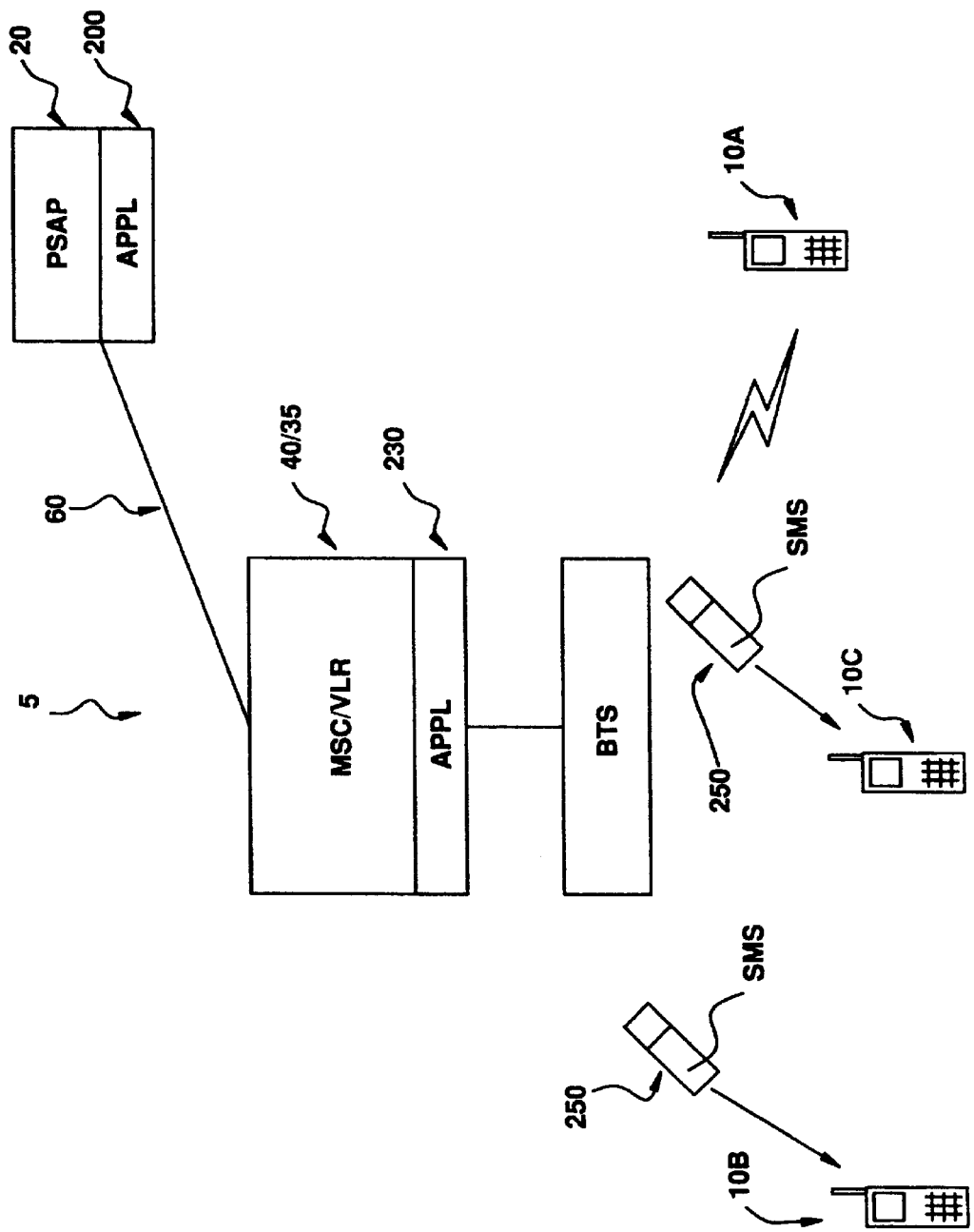
FIG. 5 is a block diagram of a mobile telecommunications network transmitting a Short Message Service (SMS) message to a mobile station traveling within a particular geographic area where an emergency has already been reported.

In yet another embodiment of the present invention, reference is now made to FIG. 5 illustrating the mobile telecommunications network 5 transmitting a Short Message Service (SMS) message to mobile stations 10 traveling within a particular geographic area where an emergency has already been reported.

In accordance with the teachings of the present invention, while establishing a first emergency call connection between the first mobile station 10A and the PSAP 20, the first application module 230 transmits location data associated with the first mobile station 10A to the PSAP 20. The second application module 200 associated with the PSAP then stores the location data. The second application module 200 then transmits unstructured data to all other mobile stations currently traveling within the same geographic area. For example, the second application module 200 may transmit unstructured data indicating that an emergency of a particular nature has been reported within a particular area to all mobile stations currently traveling within a cell area covering that particular area. A system for transmitting unstructured data to all mobile stations located within a particular cell area, for example, is fully described in a co-pending U.S. Patent application assigned to the same assignee as hereof entitled "Broadcasting Messages To Mobile Stations Within A Geographic Area", Ser. No. 08/699,661, filed on Aug. 19, 1996, and incorporated by reference herein. As a result, the second application module 200 associated with the PSAP 20 may transmit a signal instructing the serving MSC/VLR 40/35 to transmit a certain message to all mobile stations currently located within a particular cell area. Messages 250, like a Short Message Service (SMS) message or an Unstructured Supplementary Service Data (USSD) message, can be transmitted over one of the control channels towards all mobile stations 10B–10C currently located within the specified cell area. For example, a Stand-alone Dedicated Control Channel (SDDCH) or Short Message Broadcast Channel within a Global System for Mobile (GSM) based mobile telecommunications system can be utilized. Furthermore, if the location data represent GPS coordinates, the serving MSC/VLR may further translate the received coordinates into a corresponding cell area and appropriately broadcast messages to all mobile stations traveling within the determined cell area.

Upon receiving the broadcast message, all relevant mobile stations are informed of a reported incident. Such a message may prevent other mobile subscribers from attempting to report the already reported incident, and further enable the mobile subscribers to avoid or detour the reported site or location for traffic purposes.

As an alternative, the first application module 230 associated with the serving MSC/VLR 40/35 may similarly monitor emergency calls being generated within its coverage area and generate SMS or USSD messages informing associated mobile stations of the reported incident. Accordingly, the call connection 60 is established between the first mobile station 10A and the PSAP 20. Thereafter, the first application module 230 receives a signal containing description of the reported incident from the PSAP 20. Such a signal comprises an ISUP, TCAP, or any other packet data signals. The first application module 230 then transmits an unstructured data, such as an SMS or USSD message 250, to associated mobile stations 10A–10B currently traveling within the specified geographic area.

A threshold value specifying a number of call connections or attempts may further be associated with either the first or the second applications module transmitting the message transporting the unstructured data. As an illustration, the first application module associated with the PSAP 20 does not transmit an SMS or USSD message as described above until a predetermined number of emergency call connections, such as five (5), from the same geographic area have been received. This is to ensure that such broadcasting does not occur until a predetermined level of traffic or reporting has happened within a particular area.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for establishing a call connection between a mobile station and a telecommunications terminal (TT) within a mobile telecommunications network, said method comprising the steps of:

receiving an indication from a mobile station to establish a call connection with a particular TT;

determining the current location of said mobile station within said mobile telecommunications network;

determining whether another call connection from approximately said determined location has already been requested towards said TT; and providing an indication to said mobile station that a call connection has already been established from approximately said location; or otherwise, providing a call connection between said mobile station and said TT.

2. The method of claim 1 wherein said TT comprises a Public Safety Answering Point (PSAP) terminal and said indication received from said mobile station comprises a request to originate an emergency call connection.

3. The method of claim 1 wherein said step of determining said current location of said mobile station further comprises the step of determining the current cell area servicing said mobile station.

4. The method of claim 1 wherein said step of determining said current location of said mobile station further comprises the step of determining Global Positioning System (GPS) coordinates associated with said mobile station.

5. The method of claim 1 wherein said step of determining whether said another call connection from said determined location has been requested further comprises the step of determining whether a predetermined number of calls have been received from other mobile stations traveling within said determined location.

6. The method of claim 1 wherein said step of providing said indication to said mobile station further comprises the step of providing an announcement message towards said mobile station informing said mobile station of a previous call connection towards said TT from the same location.

7. The method of claim 6 further comprising the step of interrupting said announcement message and connecting to said TT by said mobile station.

8. The method of claim 1 wherein said step of providing said indication to said mobile station further comprises the step of transmitting an unstructured data message to said mobile station informing said mobile station that a previous call has already been received from another mobile station traveling within said location.

9. The method of claim 8 wherein said unstructured data message comprises a Short Message Service (SMS) message.

* * * * *